US012580170B2

(12) United States Patent (10) Patent No.: US 12,580,170 B2
Mitsui et al. (45) Date of Patent: Mar. 17, 2026

(54) MASS SPECTROMETER AND MASS SPECTROMETRY METHOD

(71) Applicant: SHIMADZU CORPORATION, Kyoto (JP)

(72) Inventors: Kazutaka Mitsui, Kyoto (JP); Hidenori Takahashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 357 days.

(21) Appl. No.: 18/265,339

(22) PCT Filed: Dec. 23, 2021

(86) PCT No.: PCT/JP2021/047978
§ 371 (c)(1),
(2) Date: Jun. 5, 2023

(87) PCT Pub. No.: WO2022/209076
PCT Pub. Date: Oct. 6, 2022

(65) Prior Publication Data
US 2024/0038515 A1 Feb. 1, 2024

(30) Foreign Application Priority Data
Mar. 29, 2021 (JP) ................................. 2021-055009

(51) Int. Cl.
*H01J 49/00* (2006.01)
*G01N 27/62* (2021.01)
(52) U.S. Cl.
CPC ........... *H01J 49/005* (2013.01); *G01N 27/62* (2013.01); *H01J 49/0031* (2013.01); *H01J 49/0077* (2013.01)
(58) Field of Classification Search
CPC .. H01J 49/0031; H01J 49/0035; H01J 49/005; H01J 49/0077; G01N 27/62
See application file for complete search history.

(56) References Cited

U.S. PATENT DOCUMENTS

| | | | |
|---|---|---|---|
| 7,582,862 B2 * | 9/2009 | Hartmer | H01J 49/145 |
| | | | 250/281 |
| 7,684,934 B2 * | 3/2010 | Shvartsburg | H01J 49/04 |
| | | | 702/27 |

(Continued)

FOREIGN PATENT DOCUMENTS

| | | |
|---|---|---|
| EP | 4 224 158 A1 | 8/2023 |
| JP | 2020-177784 A | 10/2020 |

(Continued)

OTHER PUBLICATIONS

Hidenori Takahashi et al., "Identifying Double Bond Positions in Phospholipids Using Liquid Chromatography-Triple Quadrupole Tandem Mass Spectrometry Based on Oxygen Attachment Dissociation", Mass Spectrometry, 2019, 6 pages, vol. 8, Issue 2, S0080.

(Continued)

*Primary Examiner* — Wyatt A Stoffa
(74) *Attorney, Agent, or Firm* — Sughrue Mion, PLLC

(57) ABSTRACT

Provided is a mass spectrometer including: a reaction chamber into which a precursor ion is introduced; a radical generation part configured to generate a known radical; a radical supply part configured to react the precursor ion with the radical to generate fragment ions and an adduction; a measurement control part configured to measure ions including the precursor ion, the fragment ions, and the adduct ion to obtain a mass spectrum; and an accurate mass estimation part configured to specify a peak of the adduct ion by searching a predetermined mass range centered on a mass value obtained by adding a mass of an atom or molecule derived from the radical to a mass obtained from a peak of the precursor ion, and estimate an accurate mass of the precursor ion by subtracting an accurate mass of the atom or molecule from an accurate mass of the peak.

6 Claims, 6 Drawing Sheets

[M+H]+: 786.600731 Da

ADDUCT ION
[M+H+O]+

PRECURSOR ION
[M+H]+

FRAGMENT ION

MAGNIFIED BY 50 TIMES

(56) References Cited

U.S. PATENT DOCUMENTS

| | | | | |
|---|---|---|---|---|
| 11,908,671 | B2 * | 2/2024 | Takahashi | H01J 49/0072 |
| 12,031,943 | B2 * | 7/2024 | Takahashi | H01J 49/0068 |
| 2005/0189487 | A1 * | 9/2005 | Iwamoto | H01J 49/005 |
| | | | | 250/288 |
| 2006/0138320 | A1 * | 6/2006 | Bateman | H01J 49/0031 |
| | | | | 250/281 |
| 2006/0169883 | A1 | 8/2006 | Wang et al. | |
| 2013/0228678 | A1 * | 9/2013 | Savitski | H01J 49/0045 |
| | | | | 250/282 |
| 2016/0372311 | A1 * | 12/2016 | Takahashi | H01J 49/06 |
| 2017/0084437 | A1 * | 3/2017 | Jackson | H01J 49/0072 |
| 2018/0040463 | A1 * | 2/2018 | Savitski | H01J 49/0045 |
| 2020/0111654 | A1 | 4/2020 | Takahashi et al. | |
| 2021/0050198 | A1 | 2/2021 | Takahashi | |
| 2022/0230861 | A1 | 7/2022 | Takahashi | |

FOREIGN PATENT DOCUMENTS

| | | | |
|---|---|---|---|
| WO | 2015/133259 | A1 | 9/2015 |
| WO | 2018/186286 | A1 | 10/2018 |
| WO | 2019/155725 | A1 | 8/2019 |
| WO | 2020/240908 | A1 | 12/2020 |

OTHER PUBLICATIONS

Written Opinion of PCT/JP2021/047978 dated Feb. 8, 2022 [PCT/ISA/237].

International Search Report of of PCT/JP2021/047978 dated Feb. 8, 2022 [PCT/ISA/210].

Extended European Search Report issued Aug. 19, 2024 in European Application No. 21935223.4.

* cited by examiner

Fig. 2

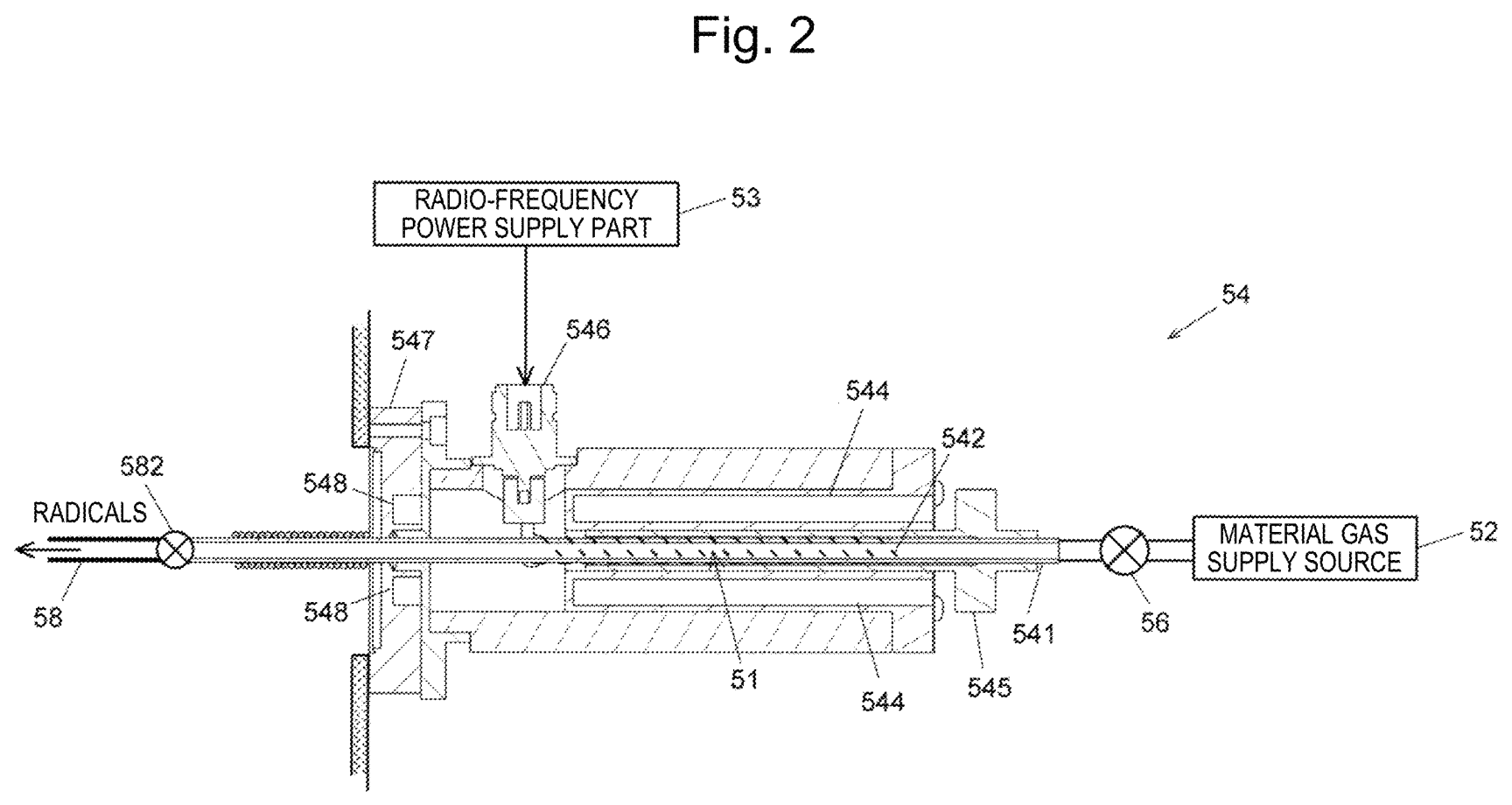

RADIO-FREQUENCY POWER SUPPLY PART 53

MATERIAL GAS SUPPLY SOURCE 52

RADICALS 54
56
541
542
545
544
544
546
547
548
548
582
58
544
51

Fig. 6

| RADICAL TYPES (X) | DIFFERENCE IN ACCURATE MASS WITH PRECURSOR ION ($[M+H]^+$) | | |
|---|---|---|---|
| | $[M+H+(X-H)]^+$ | $[M+H(+X)]^+$ | $[M+H(+X+H)]^+$ |
| HYDROGEN RADICAL | 0.0000 | 1.0078 | 2.0156 |
| OXYGEN RADICAL | 14.9862 | 15.9940 | 17.0018 |
| HYDROXY RADICAL | 15.9940 | 17.0018 | 18.0096 |
| NITROGEN RADICAL | 11.9874 | 12.9952 | 14.0030 |
| CH3 RADICAL | 14.0156 | 15.0234 | 16.0312 |
| CHLORINE RADICAL | 33.9602 | 34.9680 | 35.9758 |
| FLUORINE RADICAL | 17.9902 | 18.9980 | 20.0058 |
| PHOSPHATE RADICAL | 29.9652 | 30.9730 | 31.9808 |
| SILICON RADICAL | 30.9642 | 31.9720 | 32.9798 |

MASS SPECTROMETER AND MASS SPECTROMETRY METHOD

CROSS REFERENCE TO RELATED APPLICATIONS

This application is a National Stage of International Application No. PCT/JP2021/047978 filed on Dec. 23, 2021, claiming priority based on Japanese Patent Application No. 2021-055009 filed on Mar. 29, 2021.

TECHNICAL FIELD

The present invention relates to a mass spectrometer and a mass spectrometry method.

BACKGROUND ART

A mass spectrometry method is widely used in order to identify a polymer compound component in a sample and analyze its structure, in which an ion having a specific mass-to-charge ratio is selected as a precursor ion from ions derived from a sample component, and fragment ions generated by dissociating the precursor ion are separated according to their mass-to-charge ratio, and detected.

Many of polymer compounds are organic substances having a hydrocarbon chain as a main skeleton. In order to know the characteristics of a polymer compound, it is effective to obtain information such as the presence or absence of an unsaturated bond between carbon atoms and the presence or absence of a characteristic functional group. Therefore, recently, a radical attachment dissociation method has been proposed in which radicals are attached to precursor ions derived from a sample component to dissociate the precursor ions at the position of unsaturated bonds between carbon atoms or specific functional groups. For example, Patent Literatures 1 and 2 disclose that hydrogen radicals or the like are attached to precursor ions to selectively dissociate the precursor ions at the position of peptide bonds. In addition, Patent Literatures 3 and 4 disclose that oxygen radicals or the like are attached to precursor ions to selectively dissociate the precursor ions at the position of unsaturated bonds contained in hydrocarbon chains.

When an unknown component contained in a sample is analyzed using the radical attachment dissociation method, a data dependent analysis (DDA), for example, is performed using a mass spectrometer including a front-stage mass filter, a collision cell, and a rear-stage mass filter. In the DDA, a liquid sample is introduced into, for example, a liquid chromatograph, the components contained in the sample are separated in the column, and the separated components are introduced into the mass spectrometer. While each component is being introduced into the mass spectrometer, an MS analysis and an MS/MS analysis are continuously performed. In the MS analysis, ions generated from the sample components are separated by the front-stage mass filter or the rear-stage mass filter according to their mass-to-charge ratio, and the separated ions are sequentially detected, whereby a mass spectrum (MS spectrum) is acquired. Among peaks (mass peaks) included in the mass spectrum, a mass peak satisfying a predetermined criterion (typically, a mass peak having the highest intensity) is specified, and an ion corresponding to the mass peak is determined as a precursor ion. In the MS/MS analysis, the precursor ion is selected from ions generated from the sample components by the front-stage mass filter, the precursor ion is dissociated in the collision cell to generate fragment ions, and the fragment ions are separated by the rear-stage mass filter according to their mass-to-charge ratio and detected to acquire a product ion spectrum (MS/MS spectrum).

After completion of the MS analysis and the MS/MS analysis, a peak top at the mass peak of the precursor ion in the MS spectrum is specified, a mass-to-charge ratio of the precursor ion is calculated up to an accurate value with, for example, three digits after the decimal point, and a composition formula of a compound is estimated on the basis of the accurate mass-to-charge ratio. In addition, for the fragment ions in the MS/MS spectrum as well, a composition formula is estimated on the basis of an accurate mass-to-charge ratio at every mass peak, and a partial molecular structure of a fragment ion generated from the compound of the estimated composition formula is estimated. An entire molecular structure of the compound is estimated by combining the partial molecular structures estimated from the mass peaks of the fragment ions, so that the compound is identified.

CITATION LIST

Patent Literature

Patent Literature 1: WO 2015/133259 A
Patent Literature 2: WO 2018/186286 A
Patent Literature 3: WO 2019/155725 A
Patent Literature 4: WO 2020/240908 A
Patent Literature 5: JP 2020-177784 A

Non Patent Literature

Non Patent Literature 1: Hidenori Takahashi, Yuji Shimabu-kuro, Daiki Asakawa, Akihito Korenaga, Masaki Yamada, Shinichi Iwamoto, Motoi Wada, Koichi Tanaka, "Identifying Double Bond Positions in Phospholipids Using Liquid Chromatography-Triple Quadrupole Tandem Mass Spectrometry Based on Oxygen Attachment Dissociation", Mass Spectrometry, Volume 8, Issue 2, Pages S0080, 2019

SUMMARY OF INVENTION

Technical Problem

The amount of fragment ions generated by the radical attachment dissociation method described in Patent Literatures 1 to 4 is as small as about several percentages of the precursor ion. Therefore, in order to measure these fragment ions with sufficient intensity, it is necessary to set a detector to a high gain. Increasing the gain, however, results in saturation of the measured intensity of the precursor ion. This causes deformation in the mass peak of the precursor ion to make it impossible to accurately determine the position of the peak top, increasing an error of the accurate mass-to-charge ratio of the precursor ion. In the above DDA, in which the composition formula of the compound is estimated on the basis of the accurate mass-to-charge ratio of the precursor ion, there is a problem that it is not possible to correctly estimate the composition formula of the compound when the error of the accurate mass-to-charge ratio of the precursor ion increases, and it becomes difficult to identify the compound.

An object of the present invention is to provide a technique capable of correctly determining a mass-to-charge ratio of a precursor ion while measuring fragment ions generated by dissociating the precursor ion, with sufficient intensity when mass-analyzing the fragment ions.

Solution to Problem

A mass spectrometry method according to the present invention made to solve the above problems includes steps of:

reacting a precursor ion with a radical of a known type to generate fragment ions and an adduct ion;

setting a gain of a detector to a gain with which no halation occurs in the fragment ions and the adduct ion but halation occurs in the precursor ion;

measuring ions including the precursor ion, the fragment ions, and the adduct ion by the detector to obtain a mass spectrum;

specifying a peak corresponding to the precursor ion from the mass spectrum;

specifying a peak of the adduct ion by searching a predetermined mass range centered on a mass value obtained by adding a mass of an atom or molecule derived from the radical, assumed to be attached to the adduct ion, to a mass obtained from the specified peak corresponding to the precursor ion;

estimating an accurate mass of the precursor ion by subtracting an accurate mass of the atom or molecule derived from the radical, assumed to be attached to the adduct ion, from an accurate mass obtained from the specified peak of the adduct ion; and specifying peaks other than the specified peak of the precursor ion and the specified peak of the adduct ion in the mass spectrum, as peak candidates of the fragment ions.

A mass spectrometer according to the present invention made to solve the above problems includes:

a reaction chamber into which a precursor ion is introduced;

a radical generation part configured to generate a radical of a known type;

a radical supply part configured to supply the radical generated by the radical generation part to the reaction chamber into which the precursor ion is introduced to generate fragment ions and an adduct ion;

a measurement control part configured to measure ions including the precursor ion, the fragment ions, and the adduct ion to obtain a mass spectrum; and an accurate mass estimation part configured to specify a peak corresponding to the precursor ion in the mass spectrum, specify a peak of the adduct ion by searching a predetermined mass range centered on a mass value obtained by adding a mass of an atom or molecule derived from the radical, assumed to be attached to the adduct ion, to a mass obtained from the peak corresponding to the precursor ion, and estimate an accurate mass of the precursor ion by subtracting an accurate mass of the atom or molecule derived from the radical, assumed to be attached to the adduct ion, from an accurate mass obtained from the peak of the adduct ion.

Advantageous Effects of Invention

In the radical attachment dissociation method, only several percentages of the precursor ions react to generate the adduct ion and the fragment ions. Therefore, increasing the gain of the detector in order to measure the fragment ions with sufficient intensity results in saturation of the intensity at the mass peak of the precursor ion. On the other hand, the amount of adduct ion generated by attachment of the radical to the precursor ion is about the same as the amount of fragment ions generated by dissociation of the precursor ion. In the mass spectrometry method and the mass spectrometer according to the present invention, the gain of the detector is set so as to measure the fragment ions with sufficient intensity, making it possible to similarly measure the adduct ion with sufficient intensity, and correctly determine its accurate mass. It is possible to correctly determine the mass-to-charge ratio of the precursor ion by subtracting the accurate mass of the atom or molecule derived from the radical, assumed to be attached to the adduct ion, from the accurate mass obtained from the peak of the adduct ion.

BRIEF DESCRIPTION OF DRAWINGS

FIG. 2 is a schematic configuration diagram of a radical generation part in the mass spectrometer of the present embodiment.

FIG. 6 illustrates a difference between an accurate mass-to-charge ratio of an adduct ion generated when a precursor ion is reacted with various radicals, and an accurate mass-to-charge ratio of the precursor ion.

DESCRIPTION OF EMBODIMENTS

Hereinafter, an embodiment of a mass spectrometer and a mass spectrometry method according to the present invention will be described with reference to the drawings.

Figure 1:
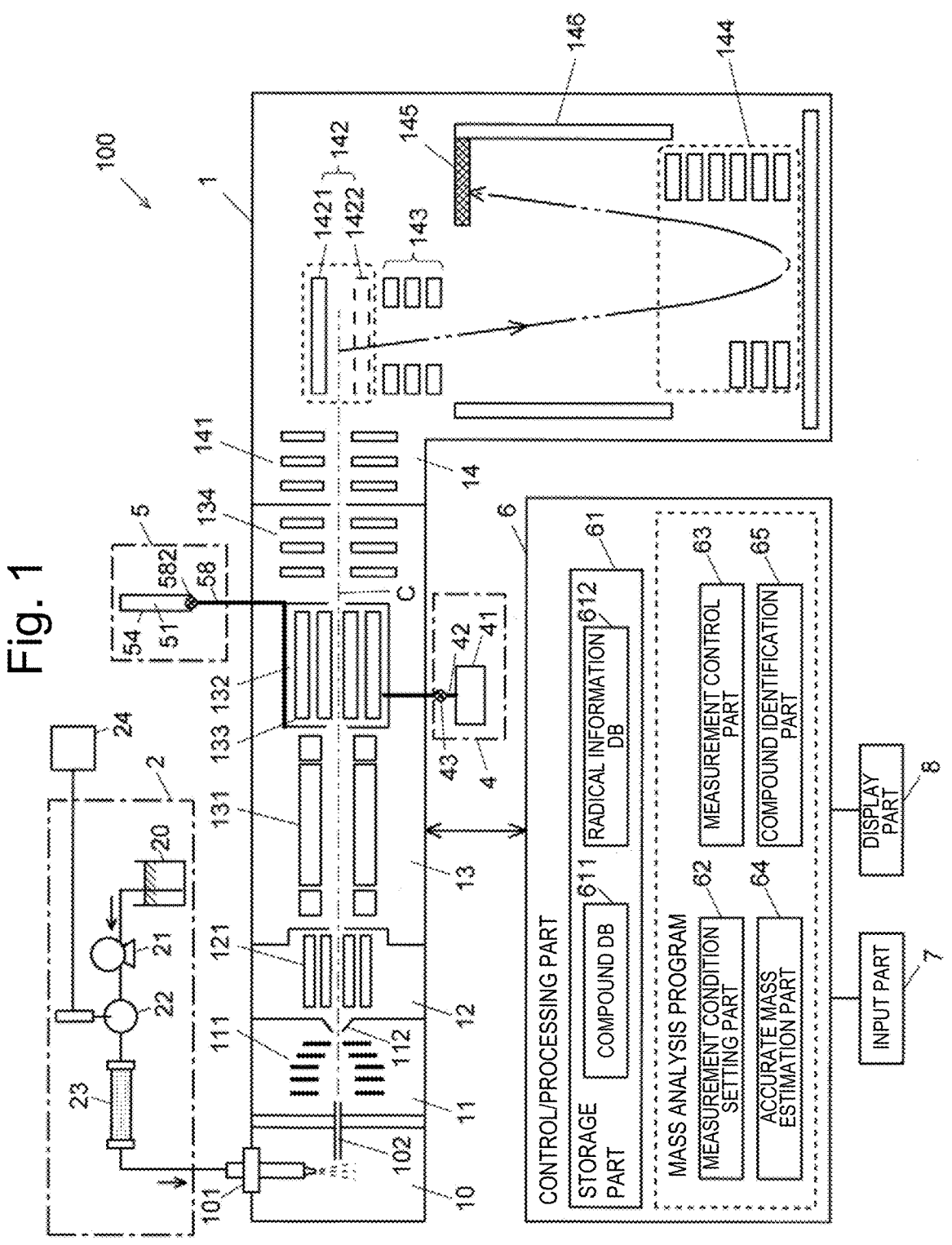
FIG. 1 is a configuration diagram of a main part of an embodiment of a mass spectrometer according to the present invention.

FIG. 1 is a configuration diagram of a main part of a liquid chromatograph mass spectrometer 100 in which a mass spectrometer 1 of the present embodiment is combined with a liquid chromatograph 2.

The liquid chromatograph 2 includes a mobile phase container 20 that stores a mobile phase, a liquid feeding pump 21 that feeds the mobile phase, an injector 22, and a column 23. In addition, to the injector 22, an autosampler 24 that introduces a plurality of liquid samples into the injector in a predetermined order is connected.

The mass spectrometer 1 includes a main body including an ionization chamber 10 at substantially atmospheric pressure and a vacuum chamber, and a control/processing part 6. The vacuum chamber includes a first intermediate vacuum chamber 11, a second intermediate vacuum chamber 12, a third intermediate vacuum chamber 13, and an analysis chamber 14 in this order from the ionization chamber 10, and has a configuration of a multi-stage differential exhaust system with increasing degree of vacuum in this order.

The ionization chamber 10 is provided with an electrospray ionization probe (ESI probe) 101 for nebulizing a liquid sample while imparting electric charges to the liquid sample. Sample components separated in the column 23 of the liquid chromatograph 2 are sequentially introduced into the ESI probe 101.

The ionization chamber 10 and the first intermediate vacuum chamber 11 communicate with each other through a small-diameter heated capillary 102. In the first intermediate vacuum chamber 11, an ion lens 111 is disposed that includes a plurality of ring-shaped electrodes having different diameters and focuses ions in the vicinity of an ion optical axis C that is a central axis of a flight path of ions.

The first intermediate vacuum chamber 11 and the second intermediate vacuum chamber 12 are separated from each other by a skimmer 112 having a small hole at its top. In the second intermediate vacuum chamber 12, an ion guide 121 is disposed that includes a plurality of rod electrodes disposed so as to surround the ion optical axis C and focuses ions in the vicinity of the ion optical axis C.

In the third intermediate vacuum chamber 13, there are disposed: a quadrupole mass filter 131 to separate ions according to their mass-to-charge ratio; a collision cell 132 including a multipole ion guide 133 inside; and an ion guide 134 to transport ions discharged from the collision cell 132. The ion guide 134 includes a plurality of ring-shaped electrodes having a same diameter.

A collision gas supply part 4 is connected to the collision cell 132. The collision gas supply part 4 includes: a collision gas source 41; a gas introduction flow path 42 for introducing gas from the collision gas source 41 into the collision cell 132; and a valve 43 for opening and closing the gas introduction flow path 42. As the collision gas, for example, an inert gas such as a nitrogen gas or an argon gas is used.

In addition, a radical supply part 5 is also connected to the collision cell 132. The radical supply part 5 has a configuration similar to that described in Patent Literature 5 and Non Patent Literature 1. As illustrated in FIGS. 1 and 2, the radical supply part 5 includes a radical source 54 in which a radical generation chamber 51 is formed, a vacuum pump (not illustrated) that exhausts the radical generation chamber 51, a material gas supply source 52 that supplies gas (material gas) as a material of radicals, and a radio-frequency power supply part 53. A valve 56 for adjusting a flow rate of the material gas is provided in a flow path from the material gas supply source 52 to the radical generation chamber 51.

FIG. 2 illustrates a cross-sectional view of the radical source 54. The radical source 54 has a tubular body 541 made of a dielectric such as alumina (for example, aluminum oxide, quartz, or aluminum nitride), and its internal space serves as the radical generation chamber 51. A plunger 545 fixes the tubular body 541 in a state in which the tubular body 541 is inserted into a hollow cylindrical magnet 544. A spiral antenna 542 (broken line in FIG. 2) is wound around the outer periphery of a portion located inside the magnet 544 of the tubular body 541.

In addition, the radical source 54 is provided with a radio-frequency power input part 546. The radio-frequency power supply part 53 supplies radio-frequency power to the radio-frequency power input part 546. The radical source 54 further includes a flange 547 for fixing a tip portion of the radical source 54. The flange 547 accommodates a hollow cylindrical magnet 548 having a same diameter as the magnet 544 and forming a pair with the magnet 544. The magnets 544 and 548 generate a magnetic field inside the tubular body 541 (radical generation chamber 51) to easily generate and maintain plasma by the action.

A transport pipe 58 for transporting radicals generated in the radical generation chamber 51 to the collision cell 132 is connected to an outlet end of the radical source 54 via a valve 582. The transport pipe 58 is an insulating pipe, and for example, a quartz glass pipe or a borosilicate glass pipe can be used.

Figure 3:
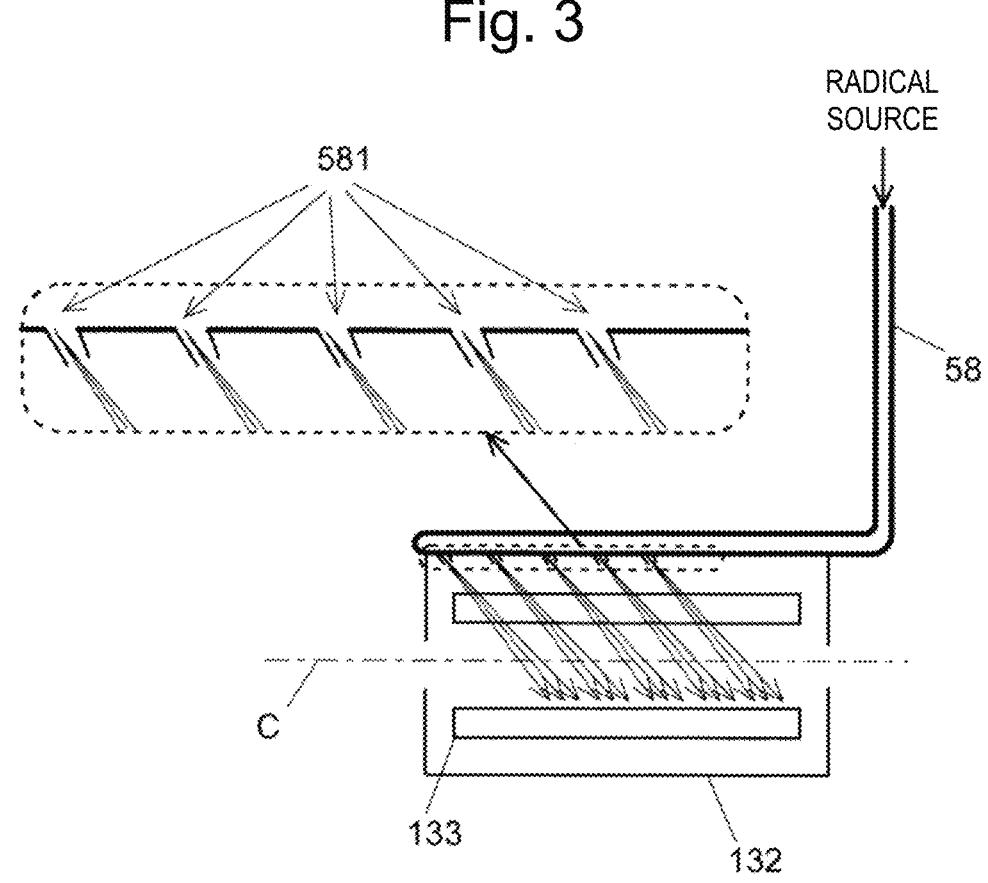
FIG. 3 is a schematic configuration diagram of a radical transport path in the mass spectrometer of the present embodiment.

As illustrated in FIG. 3, in the transport pipe 58, a plurality of head parts 581 are provided in a portion disposed along a wall surface of the collision cell 132. Each head part 581 is provided with an inclined cone-shaped introduction port, and radicals are introduced in a direction intersecting the central axis (ion optical axis C) of a flight direction of ions. As a result, the radicals are uniformly supplied to the inside of the collision cell 132.

The analysis chamber 14 includes: an ion transport electrode 141 for transporting the incident ions from the third intermediate vacuum chamber 13; an orthogonal acceleration electrode 142 including a pair of an expulsion electrode 1421 and a lead-in electrode 1422 disposed in such a manner as to face each other across the incident optical axis of the ions (an orthogonal acceleration area); an acceleration electrode 143 for accelerating the ions ejected to a flight space by the orthogonal acceleration electrode 142; a reflectron electrode 144 for forming a return path for the ions within the flight space; an ion detector 145; and a flight tube 146 configured to define a periphery of the flight space. The ion detector 145 is, for example, an electron multiplier or a microchannel plate.

The control/processing part 6 controls operations of each part and has a function of storing and analyzing data obtained by the ion detector 145. The control/processing part 6 includes a storage part 61. The storage part 61 stores a compound database 611 and a radical information database 612. In addition, the storage part 61 stores a method file describing measurement conditions when measurement to be described later is performed, and information for converting a time of flight of an ion into a mass-to-charge ratio of the ion. The control/processing part 6 further includes, as functional blocks, a measurement condition setting part 62, a measurement control part 63, an accurate mass estimation part 64, and a compound identification part 65. The entity of the control/processing part 6 is a general personal computer to which an input part 7 and a display part 8 are connected, and embodies the functional blocks described above by a processor executing a mass analysis program installed in advance.

Next, a procedure for an analysis using the liquid chromatograph mass spectrometer 100 of the present embodiment will be described as an example of the mass spectrometry method according to the present invention. In this example, a data dependent analysis (DDA) is performed in order to identify an unknown component contained in a liquid sample. In this example, a retention time of the unknown component is assumed to be known. In a case where the retention time of the unknown component is unknown, the DDA may be performed over an entire time of performing liquid chromatography. In the DDA, while each sample component is being introduced into the mass spectrometer 1, MS scan measurement is first performed to determine a precursor ion, and MS/MS scan measurement is subsequently performed to dissociate the precursor ion and acquire a product ion spectrum. In addition, before the following measurement is performed, a gain of the ion detector 145 is set to a value at which fragment ions can be measured with sufficient intensity. The gain of the ion detector 145 can be set on the basis of a result of measuring a same type of sample with a plurality of gain settings. Alternatively, the gain may be determined using a theoretical value or set on the basis of the experience of an analyst without performing preliminary measurement. Furthermore, as in a measurement example described later, when the intensities of fragment ions and adduct ions are expected to be low, the gain of the detector may be set to the maximum. In the present embodiment, precursor ions are reacted with oxygen radicals during the MS/MS scan measurement.

When a user gives an instruction to start an analysis by a predetermined input operation, the measurement condition setting part 62 displays, on the display part 8, a screen for inputting measurement conditions including information of a mass scan range, precursor ion selection conditions, a radical species, and collision-induced dissociation (CID) in the DDA. As the information of mass scan conditions, for example, the mass scan range and a scan speed in the MS scan measurement and the MS/MS scan measurement are input. As the information of the precursor ion selection conditions, for example, an ion having the highest measured intensity in MS scan measurement data is input. As the information of the radical species, for example, information of the type of radicals to be reacted with precursor ions or the type of material gas used for generation of radicals is input. For the CID, the presence or absence of introduction of the collision gas, the type of collision gas, and the magnitude of collision energy in the MS/MS measurement are selected. When the user sets necessary measurement conditions including these conditions, the measurement condition setting part 62 creates a batch file describing these conditions. When this batch file is executed, the measurement control part 63 continuously performs the MS scan measurement and the MS/MS scan measurement in accordance with the retention time of the unknown component as described below.

When the user gives an instruction to start the measurement by a predetermined input operation after creation of the batch file, first, the vacuum pump exhausts the inside of the radical generation chamber 51 to a predetermined degree of vacuum to cause the material gas (oxygen gas in the present embodiment) to be introduced from the material gas supply source 52 into the radical generation chamber 51. Subsequently, the radio-frequency power supply part 53 supplies a radio-frequency voltage to the spiral antenna 542 to generate plasma in the radical generation chamber 51. As a result, oxygen radicals are generated from the oxygen gas supplied to the radical generation chamber 51. However, at this point, the valve 582 is closed, and the oxygen radicals are not introduced into the collision cell 132.

Next, a liquid sample set in advance in the autosampler 24 by the user is introduced into the injector 22. The liquid sample is introduced into the column 23 along a mobile phase flow fed from the mobile phase container 20 by the liquid feeding pump 21. After components contained in the liquid sample are temporally separated in the column 23, the separated components are sequentially introduced into the electrospray ionization probe 101 and ionized.

The ions generated from the sample are drawn into the first intermediate vacuum chamber 11 through the heated capillary 102 by a pressure difference between the ionization chamber 10 and the first intermediate vacuum chamber 11. In the first intermediate vacuum chamber 11, the ion lens 111 focuses the ions in the vicinity of the ion optical axis C.

The ions focused in the first intermediate vacuum chamber 11 subsequently enter the second intermediate vacuum chamber 12, are again focused in the vicinity of the ion optical axis C by the ion guide 121, and then enter the third intermediate vacuum chamber 13.

When a time (retention time) at which the unknown component flows out from the column 23 is reached after the start of the measurement, the MS scan measurement is performed. In the MS scan measurement, all the ions are allowed to directly pass without operating the quadrupole mass filter 131 and the collision cell 132 in the third intermediate vacuum chamber 13. The ions having passed through the collision cell 132 are focused in the vicinity of the ion optical axis C by the ion guide 134, and then enter the analysis chamber 14.

The ion transport electrode 141 transports the ions having entered the analysis chamber 14 to the orthogonal acceleration electrode 142. A voltage is applied to the orthogonal acceleration electrode 142 at a predetermined cycle to deflect the flight direction of the ions in a direction substantially orthogonal to the previous direction. The ions with the deflected flight direction are accelerated by the acceleration electrode 143, and ejected to the flight space. The ions ejected to the flight space fly along a predetermined flight path defined by the reflectron electrode 144 and the flight tube 146 for a time corresponding to the mass-to-charge ratio of each ion, and are incident on the ion detector 145. The ion detector 145 outputs a signal having a magnitude corresponding to the incident amount of the ion every time the ion is incident. The output signals from the ion detector 145 are sequentially stored in the storage part 61. The storage part 61 stores measurement data with the time of flight of the ion and the detection intensity of the ion as axes.

When the MS scan measurement is completed, the measurement control part 63 reads the measurement data and the information for converting the time of flight of the ion into the mass-to-charge ratio of the ion stored in the storage part 61, and converts the read data into mass spectrum data with the mass-to-charge ratio of the ion and the detection intensity of the ion as axes.

The measurement control part 63 subsequently specifies a peak having the highest intensity in the mass spectrum data and acquires its mass-to-charge ratio. In the electrospray ionization probe 101 used in the present embodiment, protonated ions in which protons are added to sample molecules are usually generated the most. Hence, in the present embodiment, the protonated ion is specified as a precursor ion corresponding to the peak having the highest intensity. The mass-to-charge ratio of the precursor ion is determined using an approximate value (for example, a value with an accuracy of one or two digits after the decimal point). It is possible to obtain a numerical value with three or more digits after the decimal point. However, even when the accurate mass-to-charge ratio is obtained, the value usually includes an error because the measured intensity is saturated.

After determining the mass-to-charge ratio of the precursor ion, the measurement control part 63 subsequently performs the MS/MS scan measurement. First, the valve 582 is opened to introduce the oxygen radicals into the collision cell 132.

In the MS/MS scan measurement, similarly to the MS scan measurement, the ions generated from the sample are focused in the vicinity of the ion optical axis C while passing through the first intermediate vacuum chamber 11 and the second intermediate vacuum chamber 12, and enter the third intermediate vacuum chamber 13.

In the third intermediate vacuum chamber 13, the ions having the mass-to-charge ratio determined on the basis of the above MS scan measurement result are selected as the precursor ions by the quadrupole mass filter 131 and introduced into the collision cell 132. As described above, the oxygen radicals are introduced into the collision cell 132. The oxygen radicals are attached to the precursor ions to generate fragment ions formed by dissociating the precursor ions and adduct ions in which the oxygen radicals are attached to the precursor ions without dissociation. The fragment ions and the adduct ions (hereinafter, these ions are also collectively referred to as "product ions") generated in the collision cell 132 are focused in the vicinity of the ion optical axis C by the ion guide 134, and then enter the analysis chamber 14.

In the analysis chamber 14, as in the MS scan measurement, the product ions fly along the predetermined flight path defined by the reflectron electrode 144 and the flight tube 146 for a time corresponding to the mass-to-charge ratio of each ion, and are incident on the ion detector 145. The ion detector 145 outputs a signal having a magnitude corresponding to the incident amount of the ion every time the ion is incident. The output signals from the ion detector 145 are sequentially stored in the storage part 61. The storage part 61 stores measurement data with the time of flight of the ion and the detection intensity of the ion as axes.

When the measurement is completed, the measurement control part 63 reads the measurement data and the information for converting the time of flight of the ion into the mass-to-charge ratio of the ion stored in the storage part 61, and converts the read data into mass spectrum (product ion spectrum) data with the mass-to-charge ratio of the ion and the detection intensity of the ion as axes.

Next, the accurate mass estimation part 64 specifies a mass peak of the adduct ion in which an oxygen atom is attached to the precursor ion in the product ion spectrum. In the radical attachment dissociation method as in the present analysis example, only several percentages of the precursor ion react to generate the product ions. Hence, the mass peak having the highest intensity in the product ion spectrum is the mass peak of the precursor ion. A peak within a predetermined mass range centered on a mass larger than this mass peak by 16 Da equivalent to an approximate mass of the oxygen atom is searched for and specified as the peak of the adduct ion. The predetermined mass range may be appropriately determined according to a degree of saturation of the peak corresponding to the precursor ion. The above predetermined mass range may be widened in consideration of the fact that the approximate value of the mass-to-charge ratio of the precursor ion may have a larger error as the detection intensity of the precursor ion is saturated in a wider mass range. A specific numerical value can be, for example, ±1 Da or ±0.5 Da.

The accurate mass estimation part 64 subsequently obtains an accurate mass (mass-to-charge ratio) at the mass peak of the adduct ion with an accuracy of four digits after the decimal point, and calculates a value by subtracting an accurate mass (15.9949 Da) of the oxygen atom from the obtained value. This is an accurate mass-to-charge ratio of the precursor ion. Although it is usually sufficient to specify one adduct peak, a plurality of adduct peaks may be specified here. For example, in a case where the oxygen radical is used as in the above embodiment, a plurality of adduct peaks appear with intensities corresponding to an abundance ratio of isotopes of oxygen (15.9949 Da, 16.9991 Da, 17.9991 Da). Hence, a group of the plurality of adduct peaks may be specified.

When the accurate mass-to-charge ratio of the precursor ion is calculated, the compound identification part 65 estimates a composition formula of the unknown component on the basis of the accurate mass-to-charge ratio. In addition, mass peaks obtained by removing the mass peak of the precursor ion and the mass peak of the adduct ion from the product ion spectrum are specified as mass peak candidates of the fragment ions. A composition formula of the unknown component is also obtained from an accurate mass-to-charge ratio at the mass peak candidate of the fragment ion, and a partial molecular structure of the unknown component is estimated on the basis of the composition formula. The partial molecular structures estimated from the plurality of fragment ions are combined, and collated with molecular structures of known compounds stored in the compound database 611 to identify the unknown component. The processing of identifying a compound by estimating the partial molecular structures from the fragment ions may be performed in the same manner as in the related art using the method as described in Patent Literatures 1 to 4, and thus the description of the processing is omitted here.

In the mass spectrometry method and the liquid chromatograph mass spectrometer 100 of the present embodiment, as described above, the precursor ion derived from the sample component is reacted with the oxygen radical to generate the product ions including the adduct ion with the oxygen atom attached.

In the radical attachment dissociation method, only several percentages of the precursor ion react to generate the fragment ions. Increasing the gain of the ion detector 145 in order to measure the fragment ions with sufficient intensity results in saturation of the intensity at the mass peak of the precursor ion. On the other hand, the amount of adduct ion generated by attachment of the radical to the precursor ion is about the same as the amount of fragment ions generated by dissociation of the precursor ion. Therefore, setting the gain of the ion detector 145 so as to measure the fragment ions with sufficient intensity makes it possible to similarly measure the adduct ion with sufficient intensity, and correctly determine its mass-to-charge ratio. Hence, it is possible to correctly determine the mass-to-charge ratio of the precursor ion on the basis of the mass-to-charge ratio of the adduct ion and the mass of the atom or molecule attached to the adduct ion. In particular, in an electron multiplier or a microchannel plate widely used as the ion detector of the mass spectrometer, a dynamic range of the gain of the detector is limited to a narrow range, and the measured intensity tends to be saturated. Therefore, the mass spectrometry method and the mass spectrometer 1 of the above embodiment can be suitably used.

In the DDA, because the gain of the ion detector 145 at the time of the MS scan measurement is the same as that at the time of the MS/MS scan measurement, the measured intensity of the precursor ion is saturated also in the mass spectrum obtained by the MS scan measurement. However, the accuracy of the mass-to-charge ratio required for selecting the precursor ion in the MS/MS scan measurement is one digit to two digits after the decimal point, and thus the saturated measured intensity at the mass peak of the precursor ion in the mass spectrum causes no particular problem.

Figure 4:
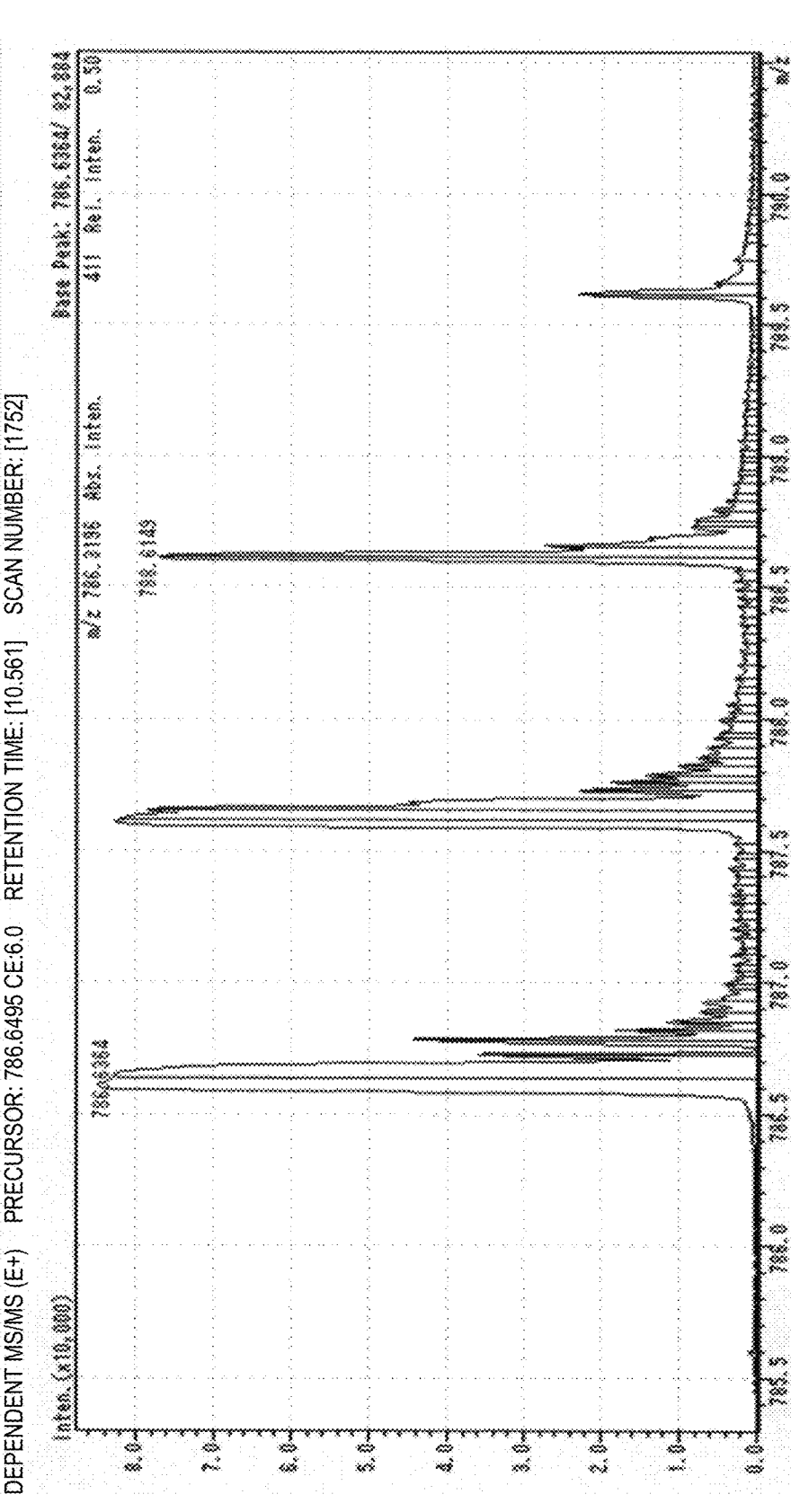
FIG. 4 illustrates a product ion spectrum measured by reacting phosphatidylcholine (PC 18:2/18:0) with oxygen radicals with an applied voltage of an ion detector set to an upper limit value.

Next, an actual measurement example will be described with reference to FIGS. 4 and 5. FIG. 4 illustrates a product ion spectrum measured by reacting phosphatidylcholine (PC 18:2/18:0) with oxygen radicals. In this measurement, a microchannel plate (MCP) was used as the ion detector. The inventors of the present invention had found, from the experience of performing measurement of reacting phospholipids with various radicals, that the intensities of fragment ions and adduct ions generated when reacting phospholipids with oxygen radicals were low. Therefore, in this measurement, the applied voltage was set to an upper limit value of 2.5 kV (that is, the gain of the detector was set to the maximum).

Figure 5:
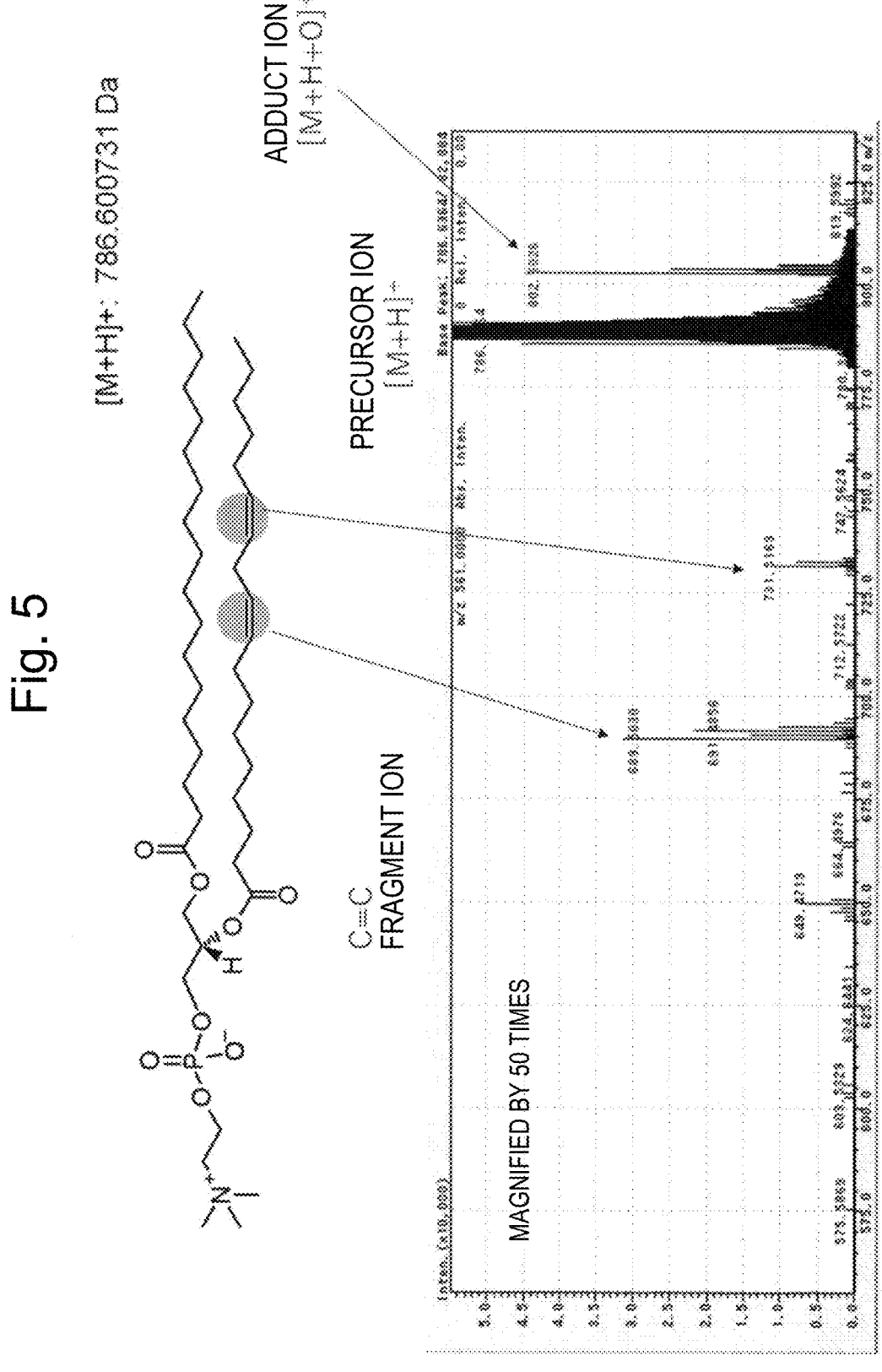
FIG. 5 illustrates a range near protonated ions in the product ion spectrum of FIG. 4.

FIG. 5 illustrates a range near protonated ions (precursor ions, $[M+H]^+$: accurate mass-to-charge ratio 786.600731) in the product ion spectrum of FIG. 4. In the product ion spectrum, it can be seen that the measured intensity at the mass peak of the protonated ions (monoisotopic ions, in which all hydrogen atoms are 1H) is saturated, and the mass peak loses its shape as illustrated in FIG. 4. In addition, the mass-to-charge ratio of the peak top of this mass peak is 786.6364. This value is significantly deviated from the true value (786.600731 Da), and the mass accuracy is about 50 ppm. The original mass accuracy of the mass spectrometer used for this measurement is 3 ppm.

When the molecular structure is estimated by performing the MS/MS scan measurement, the composition formula is estimated from the accurate mass of the precursor ion. In addition, mass peaks obtained by removing the mass peak of the precursor ion and the mass peak of the adduct ion from the product ion spectrum are specified as mass peak candidates of the fragment ions. Then, the mass peak candidate of each fragment ion is assigned on the basis of the estimated composition formula and the mass-to-charge ratio of the specified mass peak candidate of the fragment ion. Therefore, when the measured intensity is saturated and the error of the mass-to-charge ratio of the precursor ion is large as in the example illustrated in FIG. 5, a correct structural analysis cannot be performed. Typically, in order to correctly estimate the composition formula from the mass-to-charge ratio of the precursor ion, a mass accuracy of 10 ppm or more is required.

As illustrated in FIG. 5, weak fragment ions were observed because the applied voltage of the detector was set high. As described above, the measured intensity at the mass peak of the precursor ion is saturated, whereas the signal intensity of the adduct ion with the oxygen radical attached is low, and thus the mass peak is not saturated. A value of 802.6026 has been obtained as the mass-to-charge ratio. Since the accurate mass of the oxygen radical is 15.9949 Da, 802.6026−15.9949=786.6077 is obtained as the mass value of the precursor ion [M+H]⁺. This value coincides with the true value (786.600731 Da) with an accuracy of 10 ppm or more.

The above-described embodiment is merely an example, and can be modified as appropriate in accordance with the spirit of the present invention. Although the liquid chromatograph mass spectrometer is used in the above embodiment, a gas chromatograph mass spectrometer may be used. Alternatively, only a mass spectrometer may be used without using a chromatograph. In the above embodiment, the orthogonal acceleration time-of-flight type is used as the rear-stage mass filter, but a mass filter of a multiple circulation type, a magnetic field sector type, or the like can be used instead.

In addition, the accurate mass may be a mass having such accuracy that the composition formula of the compound that is an unknown sample can be estimated from the precursor ion on the basis of the accurate mass-to-charge ratio. In the above embodiment, the accurate mass is calculated with an accuracy of four digits after the decimal point. However, the required accuracy varies depending on the characteristics of the compound to be measured (the number of compounds having similar structures, etc.), and is not limited to the accuracy described in the above embodiment.

In the above embodiment, the protonated ion that is a positive ion is used as the precursor ion and reacted with the oxygen radical, but the combination of the polarity of the precursor ion and the type of radical can be changed as appropriate. In a case where a negative precursor ion is used, for example, a sodium adduct, an ammonium adduct, a potassium adduct, or a chlorine adduct can be used as the precursor ion.

Examples of the radical to be reacted with the precursor ion include a hydrogen radical, a hydroxy radical, a nitrogen radical, a methyl radical, a chlorine radical, a fluorine radical, a phosphate radical, and a silicon radical, in addition to the oxygen radical. In addition, as the material gas capable of generating such a radical, for example, a hydrogen gas capable of generating the hydrogen radical, an oxygen gas or ozone gas capable of generating the oxygen radical, water vapor capable of generating the hydrogen radical, the oxygen radical, and the hydroxy radical, a nitrogen gas capable of generating the nitrogen radical, a methyl gas capable of generating the methyl radical, a chlorine gas capable of generating the chlorine radical, a fluorine gas capable of generating the fluorine radical, phosphate vapor capable of generating the phosphate radical, or a silane gas capable of generating the silicon radical can be used. FIG. 6 illustrates a difference between the accurate mass-to-charge ratio of the adduct ion (a normal adduct ion [M+H(+X)]⁺ (middle column), an adduct ion [M+H(+X−H)]⁺ from which the hydrogen atom is desorbed (left column), and an adduct ion [M+H(+X+H)]⁺ to which the hydrogen atom is attached) obtained when various radicals (X) are used, and the accurate mass-to-charge ratio of the precursor ion.

In the above embodiment, the precursor ions passing through the collision cell 132 are reacted with the radicals. However, an ion trap can be used instead of the collision cell 132 to capture the precursor ions in the ion trap and react the precursor ions with the radicals.

In some sample components, $H_2O$, $CO_2$, a polar group, and the like describe (neutral loss) by collision with a background gas during radical induced dissociation, and as a result, precursor ions themselves may not be detected. In this case, the accurate mass of the precursor ion may be calculated from a mass value of a radical attachment ion to the neutral loss peak.

In the above embodiment, the measurement example in which the CID is not performed has been described, but the collision gas may be introduced into the collision cell 132 simultaneously with the supply of the radicals to generate the fragment ions by the CID. By using the CID in combination, more kinds of fragment ions can be generated and used for the analysis. However, when all the precursor ions are cleaved by performing the CID, the accurate mass-to-charge ratio of the precursor ion cannot be obtained by the method of the above measurement example. In such a case, the measurement control part 63 may be configured to sequentially (individually) perform the MS/MS scan measurement in which the precursor ion is reacted with the radical and MS/MS scan measurement in which the CID is performed after the MS scan measurement (the measurement condition setting part 62 may create a batch file for performing the measurement in this order).

Furthermore, in the above embodiment, the case where the MS scan measurement and the MS/MS scan measurement are performed has been described. However, the present invention can also be applied to MSⁿ scan measurement in which fragment ions are generated by trapping precursor ions in an ion trap and dissociating the precursor ions a plurality of times.

[Modes]

It is understood by those skilled in the art that the plurality of exemplary embodiments described above are specific examples of the following modes.

(Clause 1)

A mass spectrometry method according to one mode includes steps of:

reacting a precursor ion with a radical of a known type to generate fragment ions and an adduct ion;

setting a gain of a detector to a gain with which no halation occurs in the fragment ions and the adduct ion but halation occurs in the precursor ion;

measuring ions including the precursor ion, the fragment ions, and the adduct ion by the detector to obtain a mass spectrum;

specifying a peak corresponding to the precursor ion from the mass spectrum;

specifying a peak of the adduct ion by searching a predetermined mass range centered on a mass value obtained by adding a mass of an atom or molecule derived from the radical, assumed to be attached to the adduct ion, to a mass obtained from the specified peak corresponding to the precursor ion;

estimating an accurate mass of the precursor ion by subtracting an accurate mass of the atom or molecule derived from the radical, assumed to be attached to the adduct ion, from an accurate mass obtained from the specified peak of the adduct ion; and specifying peaks other than the specified peak of the precursor ion and the specified peak of the adduct ion in the mass spectrum, as peak candidates of the fragment ions.

(Clause 2)

A mass spectrometer according to one mode includes:

a reaction chamber into which a precursor ion is introduced, a radical generation part configured to generate a radical of a known type;

a radical supply part configured to supply the radical generated by the radical generation part to the reaction chamber into which the precursor ion is introduced to generate fragment ions and an adduct ion;

a measurement control part configured to measure ions including the precursor ion, the fragment ions, and the adduct ion to obtain a mass spectrum; and an accurate mass estimation part configured to specify a peak corresponding to the precursor ion in the mass spectrum, specify a peak of the adduct ion by searching a predetermined mass range centered on a mass value obtained by adding a mass of an atom or molecule derived from the radical, assumed to be attached to the adduct ion, to a mass obtained from the peak corresponding to the precursor ion, and estimate an accurate mass of the precursor ion by subtracting an accurate mass of the atom or molecule derived from the radical, assumed to be attached to the adduct ion, from an accurate mass obtained from the peak of the adduct ion.

In the mass spectrometry method according to Clause 1 and the mass spectrometer according to Clause 2, the precursor ion derived from the sample component is reacted with the radical of the known type to generate the adduct ion in which the atom or molecule corresponding to the type of radical is attached to the precursor ion and the fragment ions obtained by cleavage of the precursor ion. The ions including the precursor ion, the fragment ions, and the adduct ion are measured to obtain the mass spectrum. At this time, the gain of the detector is set to the gain with which no halation occurs in the fragment ions and the adduct ion but halation occurs in the precursor ion. Such a gain of the detector can be set on the basis of the result of measuring a same type of sample with a plurality of gain settings. Alternatively, the gain may be determined using a theoretical value or set on the basis of the experience of an analyst without performing preliminary measurement. Furthermore, when the intensities of the fragment ions and the adduct ion are expected to be low, the gain of the detector may be set to the maximum. In any case, as a result of the measurement, the gain may be set such that the fragment ions and the adduct ion can be measured with sufficient intensity and without saturation.

Subsequently, the peak corresponding to the precursor ion is individually specified from the mass spectrum. Typically, a peak having the largest height or area in the above mass spectrum is the peak corresponding to the precursor ion. Hence, the maximum peak in the mass spectrum may be specified as the peak corresponding to the precursor ion. The mass of the precursor ion is obtained from this peak. As described above, since the gain of the detector is set such that the halation occurs in the precursor ion, the peak of the precursor ion is saturated, and the mass obtained from the saturated peak includes an error. However, the mass obtained at this point only needs to be correct as an approximate value of an integer level, and for example, a numerical value after the decimal point may have some error. Subsequently, the peak of the adduct ion is specified by searching the predetermined mass range centered on the mass value obtained by adding the mass of the atom or molecule derived from the radical, assumed to be attached to the adduct ion, to this approximate value. The predetermined mass range may be determined as appropriate according to the degree of saturation of the peak corresponding to the precursor ion, and can be, for example, ±1 Da or ±0.5 Da. After that, the accurate mass of the precursor ion is estimated by subtracting the accurate mass of the atom or molecule derived from the radical, assumed to be attached to the adduct ion, from the accurate mass obtained from the specified peak of the adduct ion. Finally, the peaks other than the peaks of the precursor ion and the adduct ion in the mass spectrum are specified as the peak candidates of the fragment ions.

In the radical attachment dissociation method, only several percentages of the precursor ion react to generate the adduct ion and the fragment ions. Therefore, increasing the gain of the detector in order to measure the fragment ions with sufficient intensity results in saturation of the intensity at the mass peak of the precursor ion. On the other hand, the amount of adduct ion generated by attachment of the radical to the precursor ion is about the same as the amount of fragment ions generated by dissociation of the precursor ion. Therefore, setting the gain of the detector so as to measure the fragment ions with sufficient intensity makes it possible to similarly measure the adduct ion with sufficient intensity, and correctly determine its mass-to-charge ratio. It is possible to correctly determine the mass-to-charge ratio of the precursor ion by subtracting the accurate mass of the atom or molecule derived from the radical, assumed to be attached to the adduct ion, from the accurate mass obtained from the peak of the adduct ion.

(Clause 3)

In the mass spectrometer according to Clause 2, the radical is any of a hydrogen radical, an oxygen radical, a hydroxy radical, a nitrogen radical, a methyl radical, a chlorine radical, a fluorine radical, a phosphate radical, and a silicon radical.

As in the mass spectrometer according to Clause 3, the radical to be reacted with the precursor ion in the mass spectrometer according to Clause 2 can be any of the hydrogen radical, the oxygen radical, the hydroxy radical, the nitrogen radical, the methyl radical, the chlorine radical, the fluorine radical, the phosphate radical, and the silicon radical. All of these radicals are easily generated, and the atom or molecule attached to the precursor ion can be predicted, so that the accurate mass-to-charge ratio of the precursor ion can be obtained by simple measurement.

(Clause 4)

The mass spectrometer according to Clause 2 or 3 includes an electron multiplier or a microchannel plate as the ion detector configured to detect the ions.

The electron multiplier and the microchannel plate used in the mass spectrometer according to Clause 4 are widely used as the ion detector. Since the dynamic range of the gain of the detector is limited to a narrow range, the mass spectrometer according to Clause 2 or 3 can be particularly suitably used.

(Clause 5)

In the mass spectrometer according to any one of Clauses 2 to 4, the measurement control part is further configured to acquire mass spectrum data by performing MS scan measurement in which ions generated from a sample are mass-separated and measured, determine a precursor ion under a predetermined condition on a basis of a mass peak included in the mass spectrum data, and then perform MS/MS scan measurement in which the precursor ion is reacted with the radical.

By using the mass spectrometer of Clause 5, the data dependent analysis (DDA) can be performed on the unknown sample component.

(Clause 6)

The mass spectrometer according to Clause 5 further includes a collision gas supply part configured to supply a collision gas to the reaction chamber, in which the measurement control part is configured to perform the MS/MS scan measurement in which the precursor ion is reacted with the radical and MS/MS scan measurement in which the collision gas is supplied to the reaction chamber.

By using the mass spectrometer according to Clause 6, the sample component can be analyzed using both the fragment ions generated by the radical attachment dissociation method and the fragment ions generated by the CID method. The MS/MS scan measurement using the radical attachment dissociation method and the MS/MS scan measurement using the CID method may be performed simultaneously or individually. However, in a case where many of the precursor ions are cleaved by the CID method, it is preferable to perform the two methods sequentially (individually).

REFERENCE SIGNS LIST

100 . . . Liquid Chromatograph Mass Spectrometer
1 . . . Mass Spectrometer
10 . . . Ionization Chamber
101 . . . Electrospray Ionization (ESI) Probe
11 . . . First Intermediate Vacuum Chamber
12 . . . Second Intermediate Vacuum Chamber
13 . . . Third Intermediate Vacuum Chamber
131 . . . Quadrupole Mass Filter
132 . . . Collision Cell
133 . . . Multipole Ion Guide
14 . . . Analysis Chamber
142 . . . Orthogonal Acceleration Electrode
144 . . . Reflectron Electrode
145 . . . Ion Detector
146 . . . Flight Tube

16

2 . . . Liquid Chromatograph
20 . . . Mobile Phase Container
21 . . . Liquid Feeding Pump
22 . . . Injector
23 . . . Column
24 . . . Autosampler
4 . . . Collision Gas Supply Part
41 . . . Collision Gas Source
42 . . . Gas Introduction Flow Path
5 . . . Radical Supply Part
51 . . . Radical Generation Chamber
52 . . . Material Gas Supply Source
53 . . . Radio-Frequency Power Supply Part
54 . . . Radical Source
541 . . . Tubular Body
542 . . . Spiral Antenna
544, 548 . . . Magnet
546 . . . Radio-Frequency Power Input Part
58 . . . Transport Pipe
6 . . . Control/Processing Part
61 . . . Storage Part
611 . . . Compound Database
612 . . . Radical Information Database
62 . . . Measurement Condition Setting Part
63 . . . Measurement Control Part
64 . . . Accurate Mass Estimation Part
65 . . . Compound Identification Part
7 . . . Input Part
8 . . . Display Part
C . . . Ion Optical Axis

The invention claimed is:

1. A mass spectrometry method comprising steps of:
reacting a precursor ion with a radical of a known type to generate fragment ions and an adduction;
setting a gain of a detector to a gain with which no halation occurs in the fragment ions and the adduction but halation occurs in the precursor ion;
measuring ions including the precursor ion, the fragment ions, and the adduct ion by the detector to obtain a mass spectrum;
specifying a peak corresponding to the precursor ion from the mass spectrum;
specifying a peak of the adduct ion by searching a predetermined mass range centered on a mass value obtained by adding a mass of an atom or molecule derived from the radical, assumed to be attached to the adduction, to a mass obtained from the specified peak corresponding to the precursor ion;
estimating an accurate mass of the precursor ion by subtracting an accurate mass of the atom or molecule derived from the radical, assumed to be attached to the adduction, from an accurate mass obtained from the specified peak of the adduction; and
specifying peaks other than the specified peak of the precursor ion and the specified peak of the adduct ion in the mass spectrum, as peak candidates of the fragment ions.

2. A mass spectrometer comprising:
a reaction chamber into which a precursor ion is introduced;
a radical generation part configured to generate a radical of a known type;
a radical supply part configured to supply the radical generated by the radical generation part to the reaction chamber into which the precursor ion is introduced to generate fragment ions and an adduction;

an ion detector, a gain of which is set to a gain with which no halation occurs in the fragment ions and the adduction but halation occurs in the precursor ion;

a measurement control part configured to measure ions including the precursor ion, the fragment ions, and the adduction by using the ion detector to obtain a mass spectrum; and an accurate mass estimation part configured to specify a peak corresponding to the precursor ion in the mass spectrum, specify a peak of the adduction by searching a predetermined mass range centered on a mass value obtained by adding a mass of an atom or molecule derived from the radical, assumed to be attached to the adduction, to a mass obtained from the peak corresponding to the precursor ion, and estimate an accurate mass of the precursor ion by subtracting an accurate mass of the atom or molecule derived from the radical, assumed to be attached to the adduct ion, from an accurate mass obtained from the peak of the adduction.

3. The mass spectrometer according to claim 2, wherein the radical is any of a hydrogen radical, an oxygen radical, a hydroxy radical, a nitrogen radical, a methyl radical, a chlorine radical, a fluorine radical, a phosphate radical, and a silicon radical.

4. The mass spectrometer according to claim 2, comprising an electron multiplier or a microchannel plate as the ion detector configured to detect the ions.

5. The mass spectrometer according to claim 2, wherein the measurement control part is further configured to acquire mass spectrum data by performing MS scan measurement in which ions generated from a sample are mass-separated and measured, determine a precursor ion under a predetermined condition on a basis of a mass peak included in the mass spectrum data, and then perform MS/MS scan measurement in which the precursor ion is reacted with the radical.

6. The mass spectrometer according to claim 5, further comprising a collision gas supply part configured to supply a collision gas to the reaction chamber, wherein the measurement control part is configured to perform the MS/MS scan measurement in which the precursor ion is reacted with the radical and MS/MS scan measurement in which the collision gas is supplied to the reaction chamber.

* * * * *